United States Patent [19]

Trieselt et al.

[11] Patent Number: 4,897,215
[45] Date of Patent: Jan. 30, 1990

[54] DETERGENTS CONTAINING WATER-SOLUBLE COPOLYMERS CONTAINING AS COPOLYMERIZED UNITS MONOMERS HAVING TWO OR MORE ETHYLENICALLY UNSATURATED DOUBLE BONDS

[75] Inventors: Wolfgang Trieselt, Ludwigshafen; Richard Baur, Mutterstadt; Ekhard Winkler, Mutterstadt; Paul Diessel, Mutterstadt; Hans-Peter Seelmann-Eggebert, Schriesheim; Dieter Boeckh; Heinrich Hartmann, both of Limburgerhof, all of Fed. Rep. of Germany

[73] Assignee: BASF Aktiengesellschaft, Ludwigshafen, Fed. Rep. of Germany

[21] Appl. No.: 191,898

[22] Filed: May 10, 1988

[30] Foreign Application Priority Data

May 16, 1987 [DE] Fed. Rep. of Germany ....... 3716544

[51] Int. Cl.$^4$ ................................. C11D 3/37
[52] U.S. Cl. ..................... 252/174.24; 252/DIG. 2; 252/174.23
[58] Field of Search ............ 252/174.24, 546, DIG. 2; 526/271, 318.41, 318.43, 318.44

[56] References Cited

U.S. PATENT DOCUMENTS

| | | | |
|---|---|---|---|
| 3,955,920 | 5/1976 | Krauch et al. | 8/137 |
| 4,647,396 | 3/1987 | Denzingen et al. | 252/174.24 |
| 4,686,062 | 8/1987 | Kermode et al. | 252/99 |
| 4,702,858 | 10/1987 | Denzinger et al. | 252/174.24 |

FOREIGN PATENT DOCUMENTS

| | | |
|---|---|---|
| 2333416 | 1/1975 | Fed. Rep. of Germany ........................ 252/174.24 |
| 2910133 | 9/1980 | Fed. Rep. of Germany ........................ 252/174.24 |

*Primary Examiner*—Prince E. Willis
*Attorney, Agent, or Firm*—William G. Conger

[57] ABSTRACT

A surfactant-based detergent contains water-soluble copolymers which contain (a) from 99.5 to 15 mol % of one or more monoethylenically unsaturated $C_3$- to $C_6$-monocarboxylic acids, (b) from 0.5 to 20 mol % or one or more comonomers which have two or more ethylenically unsaturated nonconjugated double bonds and are derived from esters, (c) from 0 to 84.5 mol % of one or more monoethylenically unsaturated $C_4$- to $C_6$-dicarboxylic acids, (d) from 0 to 20 mol % of one or more hydroxyalkyl esters of monoethlenically unsaturated $C_3$- to $C_6$-carboxlic acids and (e) from 0 to 30 mol % of other water-soluble monoethylenically unsaturated monomers copolymerizable with (a) to (d)

as copolymerized units, with the proviso that the sum of the mol %ages (a) to (e) is always 100 and which have a Fikentscher K value of from 8 to 120.

5 Claims, No Drawings

DETERGENTS CONTAINING WATER-SOLUBLE COPOLYMERS CONTAINING AS COPOLYMERIZED UNITS MONOMERS HAVING TWO OR MORE ETHYLENICALLY UNSATURATED DOUBLE BONDS

It is common knowledge that detergents must contain builders, as well as surfactants. Builders are required to perform many functions in detergent formulations; for instance, they are supposed to support the surfactants in soil detachment, deactivate the water hardness formers, whether by sequestration of alkaline earth metal ions or by dispersal of hardness formers precipitated from the water, augment the dispersal and stabilization of the soil colloidally distributed in the washing liquor, and act as buffers to maintain an optimum wash pH. In solid detergent formulations, builders are supposed to make a positive contribution to good powder structure and flowability. Builders which are based on phosphate meet the above-described requirements to a high degree. For instance, for a long time pentasodium triphosphate was indisputably the most important builder in detergents. However, the phosphates present in detergents pass virtually unchanged into the effluent. Since phosphates are a good nutrient for water plants and algae, they are responsible for the eutrophication of seas and slow-flowing water courses. In water treatment plants without a tertiary treatment stage for specific precipitation of phosphates, they are not removed to a sufficient degree. There is therefore a long history of prior art concerned with replacing phosphate builders in detergents.

In the meantime, for instance, water-soluble ion exchangers based on zeolites have found use in phosphate-free or low-phosphate detergents. However, owing to their specific properties zeolites alone cannot replace phosphates as builders. The action of zeolites is supported by the inclusion of other detergent additives comprising carboxyl-containing compounds, such as citric acid, tartaric acid, nitrilotriacetic acid and in particular polymeric carboxyl-containing compounds or alkali metal and ammonium salts thereof. Of the last-mentioned compounds, the homopolymers of acrylic acid and the copolymers of acrylic acid and maleic acid are of particular importance for use as detergent additives; cf. U.S. Pat. No. 3,308,067 and EP Patent 25,551.

The polymers mentioned are ecologically safe since, in water treatment plants, they are adsorbed on the activated sludge and are removed together with the sludge from the water cycle. However, these polymers are not sufficiently biodegradable vis-a-vis the standards which effluent ingredients have to meet today.

It is an object of the present invention to provide additives for detergents based on polymers which, compared with the polymers hitherto used for this purpose, show a far better biodegradability.

We have found that this object is achieved according to the invention by using a water-soluble copolymer which contains (a) from 99.5 to 15 mol % of one or more monoethylenically unsaturated $C_3$- to $C_6$-monocarboxylic acids, (b) from 0.5 to 20 mol % of one or more comonomers which contain two or more ethylenically unsaturated nonconjugated double bonds and which are derived from esters obtainable by esterification of (b1) monoethylenically unsaturated $C_3$- to $C_6$-monocarboxylic acids with (b2) polyhydric $C_2$- to $C_6$-alcohols, water-soluble or water-insoluble polyalkylene glycols having a molecular weight of up to about 400, water-soluble polyalkylene glycols having a molecular weight of from above about 400 to 10,000, polyglycerols having a molecular weight of up to 2,000, polyvinyl vinyl alcohol having a molecular weight of up to 10,000 and monohydric, monoethylenically unsaturated $C_3$- to $C_6$-alcohols, (c) from 0 to 84.5 mol % of one or more monoethylenically unsaturated $C_4$- to $C_6$-dicarboxylic acids, (d) from 0 to 20 mol % of one or more hydroxyalkyl esters of from 2 to 6 carbon atoms in the hydroxyalkyl group of monoethylenically unsaturated $C_3$- to $C_6$-carboxylic acids and (e) from 0 to 30 mol % of other water-soluble, monoethylenically unsaturated monomers copolymerizable with (a), (b), (c) and (d)

as copolymerized units, with the proviso that the sum of the mol percentages (a) to (e) is always 100, and which has a K value of from 8 to 120 (determined on the sodium salt by the Fikentscher method on a 1% strength by weight aqueous solution at 25° C. and pH 7) as a detergent additive.

The copolymer described above acts as a builder in detergents and thus helps to boost the washing action of surfactants in the detergents, to reduce the incrustation on the washed textile material and to disperse the soil in the washing liquor. Compared with the polymers hitherto used in detergents, however, this copolymer is surprisingly biodegradable and in some instances even shows a better action.

The water-soluble copolymer is prepared by copolymerizing a monomer mixture of (a) from 99.5 to 15 mol % of one or more monoethylenically unsaturated $C_3$- to $C_6$-monocarboxylic acids, (b) from 0.5 to 20 mol % of one or more comonomers which contain two or more ethylenically unsaturated nonconjugated double bonds and which are derived from esters obtainable by esterification of (b1) monoethylenically unsaturated $C_3$- to $C_6$-monocarboxylic acids with (b2) polyhydric $C_2$- to $C_6$-alcohols, water-soluble or water-insoluble polyalkylene glycols having a molecular weight of up to about 400, water-soluble polyalkylene glycols having a molecular weight of from above about 400 to 10,000, polyglycerols having a molecular weight of up to 2,000, polyvinyl vinyl alcohol having a molecular weight of up to 10,000 and monohydric, monoethylenically unsaturated $C_3$- to $C_6$-alcohols, (c) from 0 to 84.5 mol % of one or more monoethylenically unsaturated $C_4$- to $C_6$-dicarboxylic acids, (d) from 0 to 20 mol % of one or more hydroxyalkyl esters of from 2 to 6 carbon atoms in the hydroxyalkyl group of monoethylenically unsaturated $C_3$- to $C_6$-carboxylic acids and (e) from 0 to 30 mol % of other water-soluble, monoethylenically unsaturated monomers copolymerizable with (a) to (d).

Above, the sum of the mol percentages (a) to (e) is always 100.

Component (a) of the water-soluble copolymer comprises monoethylenically unsaturated $C_3$- to $C_6$-monocarboxylic acids. Suitable carboxylic acids of this type are for example acrylic acid, methacrylic acid, ethacrylic acid, vinylacetic acid, allylacetic acid and crotonic acid. Preferably the monomer of component (a) is acrylic acid and/or methacrylic acid. The monomers of component (a) are involved in the buildup of the copolymer in a proportion of from 99.5 to 15 mol %.

An essential constituent of the copolymer comprises the monomers of component (b). They are comonomers which have two or more ethylenically unsaturated, nonconjugated double bonds and are linked by one or more ester groups. These comonomers in general bring about an increase in the molecular weight of the copolymer and are involved in the buildup of the copolymer in a proportion of from 0.5 to 20, preferably from 1 to 12, mol %.

The comonomers (b) are obtainable for example by reaction of (b1) monoethylenically unsaturated $C_3$- to $C_6$-monocarboxylic acids or mixtures thereof with (b2) polyhydric $C_2$- to $C_6$-alcohols, water-soluble or water-insoluble polyalkylene glycols having a molecular weight of up to about 400, water-soluble polyalkylene glycols having a molecular weight of from above about 400 to 10,000, polyglycerols having a molecular weight of up to 2,000, polyvinyl alcohol having a molecular weight of up to 10,000 and monohydric, monoethylenically unsaturated $C_3$- to $C_6$-alcohols or mixtures hereof.

Instead of the free acids it is also possible to use as components (b1) the ester-forming derivatives thereof, such as anhydrides, halides or esters, in particular those with lower simple alcohols.

Polyhydric $C_2$-$C_6$-alcohols are for example glycol, glycerol, pentaerythritol, sorbitol and monosaccharides, such as glucose, mannose, galactose, uronic acids, such as galacturonic acid, and saccharic acids, such as mucic acid or galactonic acid.

Water-soluble polyalkylene glycols refers to the addition products of ethylene oxide, propylene oxide, n-butylene oxide and isobutylene oxide or mixtures thereof on polyhydric alcohols having from 2 to 6 carbon atoms, for example the addition products of ethylene oxide on glycol, addition products of ethylene oxide on glycerol, addition products of ethylene oxide on pentaerythritol, addition products of ethylene oxide on monosaccharides and the addition products of mixtures of the alkylene oxides mentioned on polyhydric alcohols. These addition products may comprise block copolymers of ethylene oxide and propylene oxide, of ethylene oxide and butylene oxides or of ethylene oxide, propylene oxide and butylene oxides. Aside from the block copolymers it is also possible to use those addition products which contain the alkylene oxides mentioned as copolymerized units in random distribution. The molecular weight of the polyalkylene glycols is advantageously up to 5,000, preferably up to 2,000. Of the water-soluble polyethylene glycols, preference is given to using diethylene glycol, triethylene glycol, tetraethylene glycol and polyethylene glycol having a molecular weight of up to 1,500.

Component (b2) can also comprise polyglycerols having a molecular weight of up to 2,000. Of this class of substances, preference is given to using diglycerol, triglycerol and tetraglycerol. Also possible are polyvinyl alcohols having a molecular weight of up to 10,000, preferably polyvinyl alcohols having a molecular weight of up to 2,000. The suitable polyvinyl alcohol prepared by hydrolysis of polyvinyl acetate can be obtained by complete or partial hydrolysis of polyvinyl acetate.

Preference is given to using comonomers (b) comprising acrylic acid, methacrylic acid or anhydride, ethylene glycol, polyethylene glycol having a molecular weight of up to 2,000, glycerol, diglycerol, triglycerol, tetraglycerol, polyglycerols having a molecular weight of up to 2,000, pentaerythritol, monosaccharides, neopentylglycol and a,w-diols of from 3 to 6 carbon atoms.

The monomer of component (c) is a monoethylenically unsaturated $C_4$- to $C_6$-dicarboxylic acid, for example maleic acid, itaconic acid, citraconic acid, mesaconic acid, fumaric acid or methylenemalonic acid. It is preferable to use maleic acid or itaconic acid as monomer (c). Monomer (c) is involved in the buildup of the copolymer in a proportion of from 0 to 84.5, preferably from 5 to 60, mol %.

The copolymer may contain hydroxyalkyl esters of from 2 to 6 carbon atoms in the hydroxyalkyl group of monoethylenically unsaturated $C_3$-$C_6$-carboxylic acids as copolymerized component (d) unis. The hydroxyalkyl ester groups of this group of monomers are derived from polyhydric alcohols, for example glycol, glycerol, 1,2-propanediol, 1,3-propanediol, 1,4-butanediol, 1,3-butanediol, 2,3-butanediol, mixtures of butanediols or propanediols, 1,6-hexanediol and neopentylglycol. The polyhydric alcohols are esterified with monoethylenically unsaturated $C_3$-$C_6$-carboxylic acids. These comprise those carboxylic acids mentioned above under (a) and (c). A suitable component (d) thus comprises for example hydroxyethyl acrylate, hydroxyethyl methacrylate, hydroxy-n-propyl methacrylate, hydroxy-n-propyl acrylate, hydroxyisopropyl acrylate, hydroxyisopropyl methacrylate, hydroxy-n-butyl acrylate, hydroxyisobutyl acrylate, hydroxy-n-butyl methacrylate, hydroxyisobutyl methacrylate, hydroxyethyl monomaleate, hydroxyethyl dimaleate, hydroxypropyl monomaleate, hydroxypropyl dimaleate, hydroxy-n-butyl monomaleate, hydroxy-n-butyl dimaleate and hydroxyethyl monoitaconate. Of the hydroxyalkyl esters of monoethylenically unsaturated dicarboxylic acids, not only the monoesters but also the diesters of said acids with the abovementioned polyhydric alcohols are possible.

Preference is given to using as component (d) hydroxyethyl acrylate, hydroxyethyl methacrylate, 1,4-butanediol monoacrylate, and the technical-grade mixtures of hydroxypropyl acrylates. Of these, there is a special interest in industry in the isomer mixtures of 2-hydroxy-1-propyl acrylate and 1-hydroxy-2-propyl acrylate. These hydroxyalkyl acrylates are prepared by reacting acrylic acid with propylene oxide. The monomers of group (d) are present in the copolymer in polymerized form in a proportion of from 0 to 20, preferably of from 0 to 15, mol %.

The copolymer may contain as component (e) other water-soluble monoethylenically unsaturated monomers copolymerizable with (a), (b), (c) and (d). Suitable monomers of this kind are for example acrylamide, methacrylamide, 2-acrylamido-2-methylpropanesulfonic acid, vinylsulfonic acid, allylsulfonic acid, vinylphosphonic acid, allylphosphonic acid, acrylonitrile, methacrylonitrile, dimethylaminoethyl acrylate, diethylaminoethyl acrylate, diethylaminoethyl methacrylate, N-vinylpyrrolidone, N-vinylformamide, N-vinylimidazole, N-vinylimidazoline, 1-vinyl-2-methyl-2-imidazoline, vinyl acetate and mixtures thereof. Those monomers of this group which contain acid groups can be used in the copolymerization in the form of the free acids or else after partial or complete neutralization with alkali metal bases or ammonium bases. Basic acrylates, such as diethylaminoethyl acrylate, are neutralized or quaternized with acids and then subjected to the copolymerization. Monomer (e) is involved in the buildup of the copolymer in a proportion of from 0 to 30, preferably of from 0 to 20, mol %, merely serving to modify the copolymer.

The sum of the mol percentages of components (a) to (e) is always 100. The copolymerization is carried out in an aqueous medium, preferably in a purely aqueous medium, in the presence of polymerization initiators with or without regulants. The copolymerization can take various forms; for example, monomers (a) to (e) can be polymerized batchwise in the form of aqueous solutions. It is also possible first to introduce initially into the polymerization reactor a portion of the monomers and a portion of the initiator, to heat the mixture in an inert gas atmosphere to the polymerization temperature, and then to add the other monomers and the initiator to the reactor at the rate of polymerization. The polymerization temperatures are within the range from 20° to 200° C.. At above 100° C., pressure vessels are employed. Preferably, the polymerization temperature is from 40° to 150° C..

In a preferred embodiment of the process of preparation, first comonomer (b) is prepared by (b1) introducing methacrylic anhydride initially in a reactor and reacting it with (b2) polyhydric $C_2$-$C_6$-alcohols, water-soluble or water-insoluble polyalkylene glycols having a molecular weight of up to about 400, water-soluble polyalkylene glycols having a molecular weight from above about 400 to 10,000, polyglycerols having a molecular weight of up to 2,000, polyvinyl alcohol having a molecular weight of up to 10,000, monohydric monoethylenically unsaturated $C_3$- to $C_6$-alcohols or mixtures thereof at from 50° to 200° C..

This reaction is preferably carried out in the absence of water. In place of the free ethylenically unsaturated carboxylic acids or anhydrides it is also possible to start the preparation of comonomers (b) from the corresponding esters with monohydric $C_1$- to $C_4$-alcohols. In these cases a transesterification is carried out, and preferably the resulting $C_1$- to $C_4$-alcohol is distilled out of the reaction mixture. This variant may be carried out in the absence or presence of customary esterification catalysts.

Per mole of compound (b2), where it is a polyhydric alcohol, not less than 2 moles of compound of component (b1) are used. The reaction temperature is preferably from 50° to 150° C.. The reaction is continued until conversion of component (b2) is virtually quantitative. Comonomer (b) can be dissolved in a monoethylenically unsaturated $C_3$- to $C_6$-monocarboxylic acid as per (a) and then be subjected to copolymerization together with the monomers as per (a) which serve as the solvent medium.

However, comonomer (b) can also remain in the reaction batch in which it was prepared and initially be dissolved therein by addition of water or dilute aqueous sodium hydroxide solution. This solution is subsequently copolymerized by addition of comonomers (a) and, if used, (c) to (e). The copolymerization is carried out at a pH of the aqueous solution of from 2 to 9, preferably from 3 to 7. Monomers (a), which each contain carboxylic acid groups, can be copolymerized in the form of the free carboxylic acids or a neutralized, preferably partially neutralized, form, the degree of neutralization being from 0 to 100, preferably from 10 to 85, mol %. The neutralization is preferably effected with alkali metal or ammonium bases. These include for example sodium hydroxide solution, potassium hydroxide solution, sodium carbonate, potassium carbonate, ammonium bases such as ammonia, $C_1$-$C_{18}$-alkylamines, dialkylamines, such as dimethylamine, di-n-butylamine, dihexylamine, tertiary amines such as trimethylamine, triethylamine, tributylamine, triethanolamine and quaternized nitrogen bases, for example tetramethylammonium hydroxide, trimethyllaurylammonium hydroxide and trimethylbenzylammonium hydroxide. Neutralization is preferably effected with sodium hydroxide solution, potassium hydroxide solution or ammonia. However, the neutralization can also be effected with alkaline earth metal bases, for example calcium hydroxide or $MgCO_3$.

The polymerization initiators used are preferably water-soluble free radical formers, for example hydrogen peroxide, peroxodisulfates and mixtures of hydrogen peroxide and peroxodisulfates. Suitable peroxodisulfates are for example lithium peroxodisulfate, sodium peroxodisulfate, potassium peroxodisulfate and ammonium peroxodisulfate. In mixtures of hydrogen peroxide and peroxodisulfate, it is possible to set any desired ratio; it is preferable to use hydrogen peroxide and peroxodisulfate in a weight ratio of from 3:1 to 1:3. Mixtures of hydrogen peroxide and sodium peroxodisulfate are preferably used in a weight ratio of 1:1. The abovementioned water-soluble polymerization initiators may also be used combined with reducing agents, for example iron(II) sulfate, sodium sulfite, sodium hydrogensulfite, sodium dithionite, triethanolamine and ascorbic acid in the form of redox initiators. Suitable water-soluble organic peroxides are for example acetylacetone peroxide, methyl ethyl ketone peroxide, tert-butyl hydroperoxide and cumene hydroperoxide. They too can be used together with the abovementioned reducing agents. Further water-soluble polymerization initiators are azo starters, for example 2,2'-azobis(2-amidinopropan(e) dihydrochloride, 2,2'-azobis (N,N'-dimethylen(e)isobutyramidine dihydrochloride, 2-(carbamoylazoisobutyronitrile and 4,4'-azobis(4-cyanovaleric acid). The polymerization can also be started with water-insoluble initiators, such as dibenzoyl peroxide, dicyclohexyl peroxodicarbonate, dilauryl peroxide or azodiisobutyronitrile.

The initiators are used in amounts of from 0.1 to 15, preferably from 0.5 to 10, % by weight, based on the sum of the monomers used in the polymerization. The polymerization initiators can be added to the mixture to be polymerized either together with the monomers or separately therefrom in the form of aqueous solutions either continuously or batchwise.

The copolymerization is preferably carried out in the presence of regulants. Suitable for this purpose are preferably water-soluble compounds which either are miscible with water in any proportion or dissolve therein to more than 5% by weight at 20° C.. Compounds of this kind are for example aldehydes of from 1 to 4 carbon atoms, such as formaldehyde, acetaldehyde, propionaldehyde, n-butyraldehyde, isobutyraldehyde, formic acid, ammonium formate, hydroxylammonium salts, in particular hydroxylammonium sulfate, SH-containing compounds having up to 6 carbon atoms, such as thioglycolic acid, mercapto alcohols, such as mercaptoethanol, mercaptopropanol, mercaptobutanols, and mercaptohexanol, monohydric and polyhydric alcohols having up to 6 carbon atoms, such as isopropanol, glycol, glycerol and isobutanol. Preferred regulants are water-soluble mercaptans, ammonium formate and hydroxylammonium sulfate. The regulants are used in amounts of from 0 to 25% by weight, based on the sum of the monomers used in the polymerization. Particularly active regulants, which are preferred, are used in amounts of from 2 to not more than 15% by weight. If the copolymerization is carried out in the presence of regulants, their minimum use level is 0.2% by weight, based on the monomers to be polymerized.

Particular preference is given to the preparation of copolymers of (a) acrylic acid and/or methacrylic acid and (b) diacrylates and/or dimethacrylates of ethylene glycol, neopentyl glycol, glycerol, polyethylene glycol having a molecular weight of up to 1,500 and 1,4-butanediol.

The copolymerization of monomers (a) to (e) gives aqueous polymer solutions having a polymer content of up to 70% by weight. It is of course also possible to prepare highly dilute, for example 1% strength, aqueous solutions; however, because of economic considerations the copolymerization is guided in such a way as to prepare not less than 20% strength by weight aqueous copolymer solutions. Following the copolymerization the solutions can be brought to a pH within the range from 6.5 to 7, if the polymerization has not in any case been carried out within this range. The copolymer can be isolated by evaporating the aqueous solution. It has a low residual monomer content and is surprisingly biodegradable. The biodegradability of the copolymer as measured under German Standard Specification DIN 38,412, Part 24 (static test (L25)) is up to 100%, generally within the range from 20 to 95%.

The copolymer is water-soluble. If insoluble in water in the free acid form it can be converted into a water-soluble form by partial or complete neutralization NaOH, KOH, ammonia or amines. A copolymer whose alkali metal or ammonium salts have a solubility in water at 20° C. of not less than 20 g per liter is referred to in the present context as water-soluble. The copolymer surprisingly has the advantage at low concentrations of not precipitating in aqueous solutions which contain Ca and/or Mg ions. For this reason it is possible to prepare a stable solution of the copolymer in tap water without incurring precipitates of an alkaline earth metal salt of the copolymer.

The K value of the copolymer is within the range from 8 to 120, preferably from 12 to 100. The K value of the copolymer is determined at 25° C. and pH 7 on a 1% strength by weight aqueous solution of the sodium salt of the copolymer. If the copolymer is present in the form of another salt or in the form of the free acid, conversion into the sodium salt is necessary before the K value is determined.

The copolymer contains polymer segments of units of monomers (a) and, if used, (c) having a weight average molecular weight of up to 15,000, preferably from 300 to 8,000. These polymer segments can be detected analytically, for example by subjecting the copolymer to a four-to six-hour hydrolysis within the alkaline pH range, for example at from pH 9 to 14, at up to 100° C. in an aqueous medium. Following the hydrolysis, the reaction products are precipitated from the aqueous solution by addition of organic water-miscible solvents, such as methanol, acetone, isopropanol or mixtures of methanol and acetone. The precipitated product is washed with a solvent (methanol or acetone) and subsequently dried. The molecular weights of the hydrolysis products are determined by gel permeation chromatography (GPC) using aqueous eluants. The separating columns are calibrated with narrowly distributed polystyrene sulfates from Pressure Chem. Comp. and converted to the molecular weight units for sodium polyacrylate by the universal calibrating method of BENOIT (J. Chim. Phys. 63 (1966), 1507) using the measured data of Spatorico and Beyer, J. Appl. Polym. Sci. 19, (1975), 2933).

The copolymer described above is used according to the invention as a detergent additive. In this use, it can be added to pulverulent or alternatively liquid formulations. Detergent formulations are customarily based on surfactants with or without builders. Pure liquid detergents usually do not include builders. Suitable surfactants are for example anionic surfactants, such as $C_8$- to $C_{12}$-alkylbenzenesulfonates, $C_{12}$- to $C_{16}$-alkanesulfonates, $C_{12}$- to $C_{16}$-alkyl sulfates, $C_{12}$- to $C_{16}$-alkyl sulfosuccinates and sulfated ethoxylated $C_{12}$- to $C_{16}$-alkanols, and also nonionic surfactants, such as $C_8$ to $C_{12}$-alkylphenol ethoxylates, $C_{12}$-$C_{20}$-alkanol alkoxylates, and also block copolymers of ethylene oxide and propylene oxide. The end groups on the polyalkylene oxides may be capped. This term is to be understood as meaning that the free OH groups on the polyalkylene oxides can be etherified, esterified, acetalated and/or aminated. A further possible modification comprises reacting the free OH groups on the polyalkylene oxides with isocyanates.

The group of nonionic surfactants also includes $C_4$- to $C_{18}$-alkyl glucosides and the products obtainable from alkoxylation, in particular those which are preparable by reacting alkyl glucosides with ethylene oxide. The surfactants usable in detergents can also be of zwitterionic character and be soaps. The surfactant generally accounts for from 2 to 50, preferably from 5 to 45, % by weight of the makeup of the detergent.

Examples of builders present in detergents are phosphates, for example orthophosphate, pyrophosphate and in particular pentasodium triphosphate, zeolites, sodium carbonate, polycarboxylic acids, nitrilotriacetic acid, citric acid, tartaric acid, the salts of the acids mentioned and also monomeric, oligomeric or polymeric phosphonates. The individual substances are used in different amounts in detergent formulations, for example sodium carbonate in amounts of up to 80%, phosphates in amounts of up to 45%, zeolites in amounts of up to 40%, nitrilotriacetic acid and phosphates in amounts of up to 10% and polycarboxylic acids in amounts of up to 20%, all based on the weight of the substances and on the total detergent formulation. Because of the severe environmental pollution entailed by the use of phosphates, the phosphate content in detergents is being increasingly lowered, so that detergents these days contain not more than 25% of phosphate or preferably are even phosphate-free.

The biodegradable copolymer can also be used as an additive in liquid detergents. Liquid detergents customarily contain as a blender component liquid or even solid surfactants which are soluble or at least dispersible in the detergent formulation. Suitable surfactants for this purpose are those products which are also used in pulverulent detergents and also liquid polyalkylene oxides and polyalkoxylated compounds.

Detergent formulations may also contain as further additives corrosion inhibitors, such as silicates. Suitable silicates are for example sodium silicate, sodium disilicate and sodium metasilicate. Corrosion inhibitors can be present in the detergent formulation in an amount of up to 25% by weight. Further customary additives for detergents are bleaching agents which may be present therein in an amount of up to 30% by weight. Suitable bleaching agents are for example sodium perborate, sodium percarbonate or chlorine-releasing compounds, such as chloroisocyanurates. Another group of additives which may be present in detergents are grayness inhibitors. Known substances of this kind are carboxymethylcellulose, methylcellulose, hydroxypropylmethylcellulose and graft polymers of vinyl acetate on polyalkylene oxides having a molecular weight of from 1,000 to 15,000. Grayness inhibitors can be present in the detergent formulation in an amount of up to 5%. Further customary additives for detergents are fluorescent whitening agents, enzymes and scents. Pulverulent detergents may also contain up to 50% by weight of an extender, such as sodium sulfate. Detergent formulations can be free of water or contain small amounts thereof, for example up to 10% by weight. Liquid detergents customarily contain up to 80% by water. Customary detergent formulations are described for example in detail in German Laid-Open Application DOS 3,514,364, which is incorporated by reference.

The biodegradable copolymer described above can be added to all possible detergent formulations. The amounts used for this purpose range from 0.5 to 25, preferably from 1 to 15, % by weight, based on the total formulation. The amounts of biodegradable copolymer used are in most cases preferably from 2 to 10% by weight, based on the detergent mixture. Of particular importance is the use of the additives to be used according to the invention in phosphate-free and low-phosphate detergents. Low-phosphate formulations contain not more than 25% by weight of pentasodium triphosphate or pyrophosphate. By reason of the biodegradability, the copolymer to be used according to the invention is preferably used in phosphate-free formulations.

If desired, the biodegradable copolymer to be used according to the invention may be used together with nonbiodegradable copolymers of acrylic acid and maleic acid or homopolymers of acrylic acid in detergent formulations. The latter nonbiodegradable polymers have hitherto been used as incrustation inhibitors in detergent formulations. Besides the aforementioned polymers it is also possible to use copolymers of $C_3$- to $C_6$-mono-carboxylic and -dicarboxylic acids or maleic anhydride and $C_1$- to $C_4$-alkyl vinyl ethers. The molecular weight of the homopolymers and copolymers is from 1,000 to 100,000. If desired, these incrustation inhibitors can be used in an amount of up to 10% by weight, based on the total formulation, in detergents alongside the biodegradable copolymer to be used according to the invention. Although the known incrustation inhibitors based on the abovementioned polymers are not biodegradable, they can nonetheless be removed from the effluent in water treatment plants together with the activated sludge onto which they become adsorbed. The biodegradable copolymer can be added to detergent formulations in the form of the free acid, in completely neutralized form or in partially neutralized form.

The K values given in the Examples were determined by the method of H. Fikentscher, Cellulosechemie 13 (1932), 58–64, 71–74; $K = k \cdot 10^3$. The measurements were carried out in all cases on a 1% strength by weight aqueous solution of the sodium salt of the polymer at 25° C. and pH 7. The biodegradability of the copolymer was determined in accordance with German Standard Specification DIN 38,142 part 24 (static test (L25)).

EXAMPLES

Preparation of biodegradable copolymers

General method of preparation for copolymers 1 to 7

In a 2 L glass reactor equipped with a stirrer, a thermometer, 4 add vessels and inert gas supply means, n mol of monomer (c) are dissolved in 150 ml of water and heated to from 90° to 95° C.. Starting at the same time, p mol of monomer (b), dissolved in q mol of monomer (a), an amount of 25% strength sodium hydroxide solution equivalent to monomer (a), and, if used at all, m % by weight of regulant as a 20% strength solution in water are metered in under inert gas in the course of 4 hours; in the same way, 5% by weight of hydrogen peroxide in the form of a 10% strength solution in water are added in the course of 5 hours. The viscous solution is subsequently polymerized at 95° C. for 2 hours and brought to pH 6.5 with 25% strength aqueous sodium hydroxide solution. Table 1 contains details of the starting materials and of the copolymers.

General method of preparation for copolymers 8 to 11

A 2 L glass reactor equipped with a stirrer, a thermometer, 4 add vessels and inert gas supply means is charged with 100 ml of fully demineralized water at 80° C. and starting at the same time over a period of 4 hours, with a solution of p mol of monomer (b) in q mol of monomer (a), m parts by weight of regulant, dissolved in 50 ml of water, from 0.69 to 1.50 mol of sodium hydroxide, 25% strength in water, and also over a period of 5 hours 2 parts by weight of 2,2'-azobis(2-amidinopropan(e) dihydrochloride, dissolved in 50 ml of water. Thereafter the mixture is polymerized at 80° C. for a further 2 hours and brought to pH 6.5 with 50% strength aqueous NaOH. Table 1 contains details of the starting materials for the copolymerization and of the copolymers.

TABLE 1

| Copolymer | Monomer (a) AS q[mol]/[mol %] | Monomer (c) MSA n[mol]/[mol %] | Monomer (b) p[mol]/[mol %] | Regulant m [% by wt.] | K value | Biodegradability [%] |
|---|---|---|---|---|---|---|
| 1 | 1.85/77.1 | 0.5/20.8 | Diethylene glycol diacrylate 0.050/2.1 | — | 57.3 | 39 |
| 2 | 1.85/73.7 | 0.5/21.0 | Diethylene glycol diacrylate 0.125/5.3 | ME 6 | 54.0 | 62 |
| 3 | 1.25/52.6 | 1.0/42.1 | Tripropylene glycol diacrylate 0.125/5.3 | ME 6 | 48.9 | 45 |
| 4 | 1.25/52.6 | 1.0/42.1 | Thiodiethylene glycol | ME 6 | 39.3 | 69 |

TABLE 1-continued

| Copolymer | Monomer (a) AS q[mol]/[mol %] | Monomer (c) MSA n[mol]/[mol %] | Monomer (b) p[mol]/[mol %] | Regulant m [% by wt.] | K value | Biodegrad-ability [%] |
|---|---|---|---|---|---|---|
| 5 | 1.88/76.9 | 0.5/20.5 | dimethacrylate 0.125/5.3 PEG$_{400}$ diacrylate 0.063/2.6 | ME 5 | 56.2 | 63 |
| 6 | 1.91/77.8 | 0.5/20.4 | PEG$_{400}$ diacrylate 0.044/1.8 | ME 5 | 42.5 | 55 |
| 7 | 1.25/52.6 | 1.0/42.1 | Hexanediol dimethacrylate 0.125/5.3 | ME 4 | 38.9 | 52 |
| 8 | 1.38/95.8 | — | Tripropylene glycol diacrylate 0.063/4.2 | ME 10 | 55.4 | 47 |
| 9 | 1.50/96.9 | — | PEG$_{400}$ diacrylate 0.048/3.1 | AF 10 | 23.8 | 77 |
| 10 | 1.44/96.9 | — | Ethylene glycol diacrylate 0.046/3.1 | AF 10 | 41.9 | 42 |
| 11 | 1.38/95.8 | — | Tripropylene glycol diacrylate 0.06/4.2 | AF 10 | 44.7 | 45 |
| | | | Comparison with prior art | | | |
| 12 | Na salt of a copolymer of 70% by wt. of acrylic acid and 30% by wt. of maleic acid | | | | 60.0 | <10 |
| 13 | Na salt of a homopolymer of acrylic acid | | | | 100 | <10 |

Abbreviations: ME = mercaptoethanol
AF = ammonium formate
HAS = hydroxylammonium sulfate
PEG$_{400}$ = polyethylene glycol having a molecular weight of 400

The copolymers indicated in Table 1 as nos. 1, 2, 6, 8 and 9 were tested in respect of precipitation at pH 7.5 in aqueous solutions containing from 10 to 10,000 mg/l of Ca ions (in the form of CaCl2). The following Ca ions concentrations were tested: 10, 50, 75, 100, 150, 500, 1,000 and 10,000 mg/l. The copolymer concentrations were varied from 0.1 to 7 mg/l (giving the following test concentrations: 0.1, 0.5, 1.0, 2, 3, 4 and 7 mg of copolymer/l of water). In this test, even 20 days of storage of the aqueous solutions of the copolymers in the presence of Ca ions did not give rise to any precipitates, while a copolymer of 30% by weight of maleic acid and 70% by weight of acrylic acid, which had a K value of 60, always gave rise to precipitates under the stated test conditions.

The biodegradability of the copolymers was additionally demonstrated in bacterial growth tests. For this purpose, an enrichment medium was prepared on solid nutrient media and set with 18 g/l of agar. The enrichment medium had the following composition:
disodium hydrogenphosphate with 2 H$_2$O: 7 g/l
potassium dihydrogenphosphate: 3 g/l
sodium chloride: 0.5 g/l
ammonium chloride: 1.0 g/l
solution of trace elements: 2.5 ml/l pH 7.0
(prepared according to T. Bauchop and S. R. Elsden, J. Gen. Microbiol. 23 (1960), 457–469).

The copolymers described in Table 1 under nos. 1 to 11 were each added to the nutrient media in concentrations of 10 g/l.

Soil samples were either added to the liquid medium and shaken therein at 30° C. for 7 days or applied directly in the form of an aqueous suspension to solid nutrient media and likewise incubated at 30° C. The enrichment cultures in the liquid medium were transferred to solid nutrient bases after 7 days. Colonies growing well on these plates were plated out and isolating streaks were examined for purity.

This method led to the isolation of pure bacterial cultures which exhibited clear signs of growth on the copolymers under test.

If, by contrast, the bacterial growth tests described above were carried out for comparison on copolymers 12 and 13, no bacterial growth was detectable.

The action of the biodegradable copolymers to be used according to the invention in detergents is illustrated in the Examples which follow. The reaction of the biodegradable copolymers as builders results from the ability of these polymers to inhibit incrustations on the laundry, to boost the washing power of the detergents and to reduce the graying of white test material on washing in the presence of soil cloth.

To this end, test fabrics are subjected to repeated washes in detergent formulations containing a wide range of builders and either no copolymer or the biodegradable copolymer to be used according to the invention and for comparison with the prior art a previously used copolymer of acrylic acid and maleic acid. The last three washes of a series were each carried out in the presence of standard soil cloth. The extent to which the whiteness of the test fabric is reduced is a measure of graying. The extent to which the whiteness of the soil cloth is increased is a measure of the washing power of the detergent used and is determined photometrically as percentage reflectance.

Incrustation values are obtained by ashing the polyester/cotton blend fabric or the cotton terry towelling fabric after the test. The ash content is given in weight percent. The lower the ash content of the test fabric, the higher the effectiveness of the polymer present in the detergent. Depending on the effectiveness of the builder used in the detergent, different quantities need to be used of the biodegradable copolymers to be used according to the invention.

| Test conditions | |
|---|---|
| instrument: | Launder-O-Meter from Atlas, Chicago |
| no. of wash cycles: | 20 |
| washing liquor: | 250 ml, the water used having 4 mmol of hardness per liter (calcium:magnesium = 4:1) |
| wash duration: | 30 min. at 60° C. (including heating-up time) |
| detergent dose: | 8 g/l |
| test fabric: | 5 g of polyester (store no. 655) |

| | Test conditions |
|---|---|
| soil cloth: | 5 g of polyester/cotton (store no. 776)<br>5 g of cotton terry towelling (store no. 295)<br>5 g of EMPA 104 (standard soil cloth of Swiss Materials Testing Institute, St. Gallen (CH)) (cf. Table). | polymer as described in EP Patent 25,551 of acrylic acid and maleic aci(d) or copolymer 13, a homopolymer of acrylic acid. The detergent formulations used in the Examples and Comparative Examples and the results obtained therewith are indicated in Tables 3 to 5.

The test results indicated in Table 5 were obtained under more rigorous conditions. The test temperature was 90° C.. The polyester and the polyester/cotton fabric was replaced by cotton fabric (store no. 222).

TABLE 3

| Example No. | Comparative Example No. | Detergent formulation No. | Addition to detergent formulation | | % reflectance of soil cloth EMPA 104 |
|---|---|---|---|---|---|
| | | | Parts by wt. | Copolymer No. | |
| — | 1 | 5 | 0 | — | 24 |
| — | 2 | 5 | 3 | 13 | 29.5 |
| 1 | — | 5 | 3 | 8 | 28.9 |
| — | 3 | 6 | 0 | — | 28.9 |
| — | 4 | 6 | 2.5 | 13 | 30.5 |
| 2 | — | 6 | 2.5 | 9 | 32.7 |
| — | 5 | 1 | 0 | — | 32.2 |
| — | 6 | 1 | 2.5 | 13 | 35.3 |
| 3 | — | 1 | 2.5 | 10 | 37.6 |

As Table 3 reveals, the addition of the copolymers to be used according to the invention to the detergent formulations tested results in an increase in the washing action of these detergents.

TABLE 2

| | Detergent formulations 1 to 6 | | | | | | |
|---|---|---|---|---|---|---|---|
| | | Composition in parts by weight | | | | | |
| | Detergent component | 1 | 2 | 3 | 4 | 5 | 6 |
| Surfactants | Dodecylbenzenesulfonate (50%) | 12.5 | 12.5 | — | 12.5 | 12.5 | 12.5 |
| | $C_{13}/C_{15}$—oxoalcohol polyglycol ether (7 mol of ethylene oxide added onto 1 mol of $C_{13}/C_{15}$—oxoalcohol) | 4.7 | 4.7 | 1.0 | 4.7 | 4.7 | 4.7 |
| | Soap | 2.8 | 2.8 | 2.8 | 2.8 | 2.8 | 2.8 |
| Builders | Pentasodium triphosphate | 20 | | 20 | 10 | 10 | 10 |
| | Zeolite A | | 25 | | 20 | 20 | 20 |
| | Sodium carbonate | | | 10 | | | 10 |
| | NTA[1] | | | | 3.5 | | 3.5 |
| | Phosphonate[2] | | | | | 1 | |
| Silicates | Na disilicate | 6 | 6 | 6 | 6 | 6 | 6 |
| Grayness inhibitors | Carboxymethylcellulose | 1 | 1 | 1 | 1 | 1 | 1 |
| Bleaching agents | Na perborate | 20 | 20 | 20 | 20 | 20 | 20 |
| Extenders | Sodium sulfate | 30.5 | 22 | 27.2 | 16.5 | 19 | 10.5 |

[1]trisodium salt of nitrilotriacetic acid
[2]diethylenetriaminepentamethylenephosphonate The detergent formulations indicated in Table 2 were tested using the methods described above. For comparison with the prior art the detergent formulations contained either no copolymer or copolymer no. 12 (co-

TABLE 4

| | | | Test of incrustation-inhibiting action at 60° C. | | | |
|---|---|---|---|---|---|---|
| Example No. | Comparative Example No. | Detergent formulation No. | Addition to detergent formulation | | % by wt. of ash in test fabric | Terry towelling 295 |
| | | | Parts by wt. | Copolymer No. | cotton/polyester 776 | |
| — | 7 | 3 | 0 | — | 1.33 | 3.25 |
| — | 8 | 3 | 3 | 13 | 0.26 | 0.47 |
| 4 | — | 3 | 3 | 1 | 0.51 | 0.66 |
| — | 9 | 4 | 0 | — | 4.11 | 10.52 |
| — | 10 | 4 | 3 | 13 | 0.19 | 0.77 |
| 5 | — | 4 | 3 | 2 | 0.32 | 0.95 |
| — | 11 | 5 | 0 | — | 2.73 | 5.66 |
| — | 12 | 5 | 3 | 13 | 0.62 | 0.80 |
| 6 | — | 5 | 3 | 8 | 0.82 | 1.50 |
| — | 13 | 6 | 0 | — | 1.65 | 3.49 |
| — | 14 | 6 | 2.5 | 13 | 0.34 | 0.70 |
| 7 | — | 6 | 2.5 | 9 | 0.60 | 1.40 |
| — | 15 | 1 | 0 | — | 1.50 | 8.95 |
| — | 16 | 1 | 2.5 | 13 | 1.04 | 3.98 |
| 8 | — | 1 | 2.5 | 10 | 0.95 | 3.62 |
| — | 17 | 2 | 0 | — | 1.04 | 1.82 |
| — | 18 | 2 | 6 | 13 | 0.71 | 0.69 |

TABLE 4-continued

| | | | Test of incrustation-inhibiting action at 60° C. | | | |
|---|---|---|---|---|---|---|
| Example No. | Comparative Example No. | Detergent formulation No. | Addition to detergent formulation Parts by wt. | Copolymer No. | % by wt. of ash in test fabric cotton/polyester 776 | Terry towelling 295 |
| 9 | — | 2 | 6 | 11 | 0.52 | 0.67 |

TABLE 5

| | | | Test of incrustation-inhibiting action of copolymers at 90° C. | | | |
|---|---|---|---|---|---|---|
| Example No. | Comparative Example No. | Detergent formulation No. | Addition to detergent formulation Parts by wt. | Copolymer No. | % by wt. of ash in test fabric cotton 222 | terry towelling 295 |
| — | 19 | 2 | 0 | — | 1.46 | 5.95 |
| 2 | 20 | 2 | 10 | 12 | 0.44 | 2.81 |
| 10 | — | 2 | 10 | 3 | 0.40 | 2.72 |
| 11 | — | 2 | 10 | 4 | 0.42 | 2.51 |
| 12 | — | 2 | 10 | 5 | 0.40 | 2.80 |
| 13 | — | 2 | 10 | 6 | 0.40 | 2.65 |
| 14 | — | 2 | 10 | 7 | 0.38 | 2.20 |

Table 5 reveals that even under more rigorous conditions (washing temperature 90° C., phosphate-free detergent) the incrustation is substantially suppressed in the case of cotton cheesecloth and appreciably reduced in the case of voluminous cotton terry towelling.

We claim:

1. A surfactant-based detergent composition which contains from 0.5 to 25% by weight of a water-soluble copolymer which contains
   (a) from 99.5 to 15 mol % of one or more monoethylenically unsaturated $C_3$- to $C_6$-monocarboxylic acids,
   (b) from 0.5 to 20 mol % of one or more comonomers which contain two or more ethylenically unsaturated nonconjugated double bonds and which are derived from esters obtainable by esterification of
      (b1) monoethylenically unsaturated $C_3$- to $C_6$-monocarboxylic acids with
      (b2) polyhydric $C_2$- to $C_6$-alcohols, water-soluble or water-insoluble polyalkylene glycols having a molecular weight of up to about 400, water-soluble polyalkylene glycols having a molecular weight of from above about 400 to 10,000, polyglycerols having a molecular weight of up to 2,000, polyvinyl alcohol having a molecular weight of up to 10,000 and monohydric, monoethylenically unsaturated $C_3$- to $C_6$-alcohols,
   (c) from 0 to 84.5 mol % of one or more monoethylenically unsaturated $C_4$- to $C_6$-dicarboxylic acids,
   (d) from 0 to 20 mol % of one or more hydroxyalkyl esters of from 2 to 6 carbon atoms in the hydroxyalkyl group of monoethylenically unsaturated $C_3$- to $C_6$-carboxylic acids and
   (e) from 0 to 30 mol % of other water-soluble, monoethylenically unsaturated monomers copolymerizable with (a), (b), (c) and (d)
as copolymerized units, with the proviso that the sum of the mol percentages (a) to (e) is always 100, and which has a K value of from 8 to 120 (determined on the sodium salt by the Fikentscher method on a 1% strength by weight aqueous solution at 25° C. and pH 7).

2. A detergent composition as claimed in claim 1 wherein said water-soluble copolymer contains
   (a) from 99.5 to 80 mol % of one or more monoethylenically unsaturated $C_3$- to $C_6$-monocarboxylic acids and
   (b) from 0.5 to 20 mol % of one or more comonomers which contain two or more ethylenically unsaturated nonconjugated double bonds and which are derived from esters obtainable by esterification of
      (b1) monoethylenically unsaturated $C_3$- to $C_6$-monocarboxylic acids with
      (b2) polyhydric $C_2$- to $C_6$-alcohols, water-soluble or water-insoluble polyalkylene glycols having a molecular weight of up to about 400, water-soluble polyalkylene glycols having a molecular weight of from above about 400 to 10,000, polyglycerols having a molecular weight of up to 2,000, polyvinyl alcohol having a molecular weight of up to 10,000 and monohydric, monoethylenically unsaturated $C_3$- to $C_6$-alcohols,
as copolymerized units and have a K value of from 8 to 120.

3. A detergent composition as claimed in claim 1 wherein said water-soluble copolymer contains
   (a) from 99 to 15 mol % of one or more monoethylenically unsaturated $C_3$- to $C_6$-monocarboxylic acids,
   (b) from 0.5 to 15 mol % of one or more comonomers which contain two or more ethylenically unsaturated nonconjugated double bonds and which are derived from esters obtainable by esterification of
      (b1) monoethylenically unsaturated $C_3$- to $C_6$-monocarboxylic acids with
      (b2) polyhydric $C_2$- to $C_6$-alcohols, water-soluble or water-insoluble polyalkylene glycols having a molecular weight of up to about 400, water-soluble polyalkylene glycols having a molecular weight of from above about 400 to 10,000, polyglycerols having a molecular weight of up to 2,000, polyvinyl alcohol having a molecular weight of up to 10,000 and monohydric, monoethylenically unsaturated $C_3$- to $C_6$-alcohols,
   (c) from 0.5 to 84.5 mol % of one or more monoethylenically unsaturated $C_4$- to $C_6$-dicarboxylic acids
as copolymerized units, with the proviso that the sum of the mol percentages (a) to (c) is always 100 and which has a K value of from 12 to 100 (determined on a 1% strength by weight aqueous solution of the Na salt of the copolymer at 25° C. and pH 7 by the Fikentscher method).

4. A detergent as claimed in claim 1 wherein said water-soluble copolymer which contains as copolymerized monomer (b) units one or more compounds preparable by esterification of (b1) acrylic acid or methacrylic acid and (b2) ethylene glycol, polyethylene glycol having a molecular weight of up to 2,000, glycerol, polyglycerols having a molecular weight of up to 2,000, pentaerythritol, monosaccharides and neopentylglycol.

5. A detergent composition as claimed in claim 1 which is phosphate-free and contains one or more of said water-soluble copolymers in an amount of from 2 to 10% by weight.

* * * * *

UNITED STATES PATENT AND TRADEMARK OFFICE
CERTIFICATE OF CORRECTION

PATENT NO. : 4,897,215

DATED : January 30, 1990

INVENTOR(S) : WOLFGANG TRIESELT ET AL

It is certified that error appears in the above-identified patent and that said Letters Patent is hereby corrected as shown below:

In claim 4, column 16, line 65:

after "detergent" insert therefor --composition--.

In claim 4, column 16, line 66:

after "copolymer" delete "which"

Signed and Sealed this

Fifth Day of March, 1991

Attest:

HARRY F. MANBECK, JR.

Attesting Officer

Commissioner of Patents and Trademarks